(No Model.)
L. FARIS.
DEVICE FOR SECURING WHEELS TO AXLES.
No. 446,335. Patented Feb. 10, 1891.
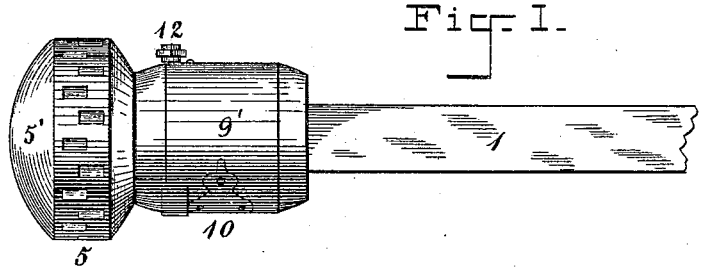
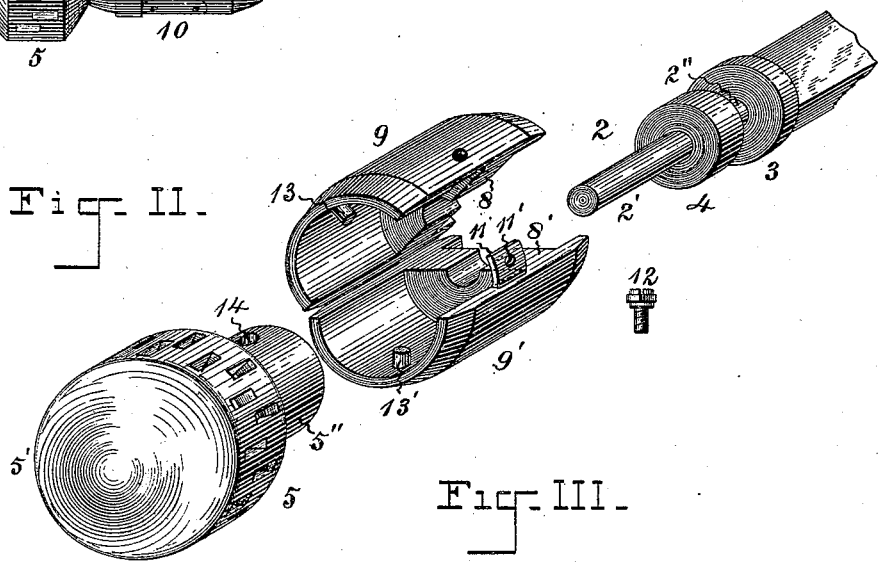
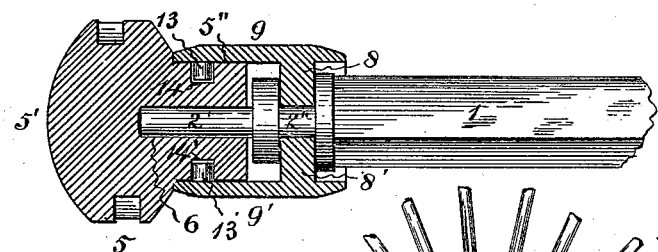
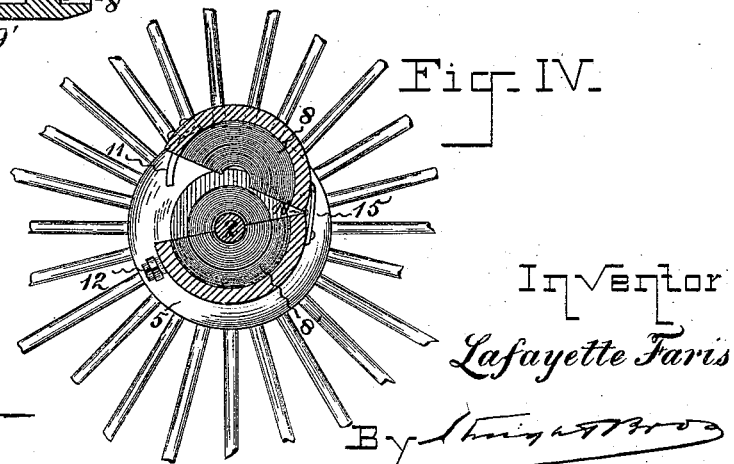
Witnesses
John F. Nelson
Lillie Hanna
Inventor
Lafayette Faris
By Strught Bros
Att'ys.

UNITED STATES PATENT OFFICE.

LAFAYETTE FARIS, OF PRICETOWN, OHIO, ASSIGNOR OF ONE-HALF TO THOMAS W. DE HASS AND JOHN H. GOSSETT, BOTH OF SAME PLACE.

DEVICE FOR SECURING WHEELS TO AXLES.

SPECIFICATION forming part of Letters Patent No. 446,335, dated February 10, 1891.

Application filed October 13, 1890. Serial No. 367,974. (No model.)

*To all whom it may concern:*

Be it known that I, LAFAYETTE FARIS, a citizen of the United States, residing at Pricetown, Highland county, State of Ohio, have invented a new and Improved Device for Securing Wheels to Axles, of which the following is a specification.

My invention is more especially designed for and is here shown as applied to a road-vehicle; and it relates to a construction of wheel-hub and, relatively thereto, of axle-spindle which permits the hub to be closed entirely in front, so as to admit of any desired finish, wholly exclude dust, sand, &c., and prevent both escape of lubricant and its drying and "gumming" upon the spindle.

In the accompanying drawings, which form a part of this specification, Figure I is a side elevation which shows a wheel-hub and corresponding axle-spindle embodying my invention. Fig. II shows the parts detached. Fig. III is an axial section of the parts in position. Fig. IV is a transverse section of the sleeve in partly-open condition.

1 may represent a portion of an axle-body, and 2 may represent one of its two spindles. Forged integrally with the spindle are two collars, of which one collar 3 constitutes the shoulder of the axle proper. Located somewhat nearer the spindle-point than shoulder 3 is the collar 4, which serves as the abutment against which the rear face of the hub 5 revolves. The portion 2' of the spindle from said collar outward to the spindle-point occupies a suitable box or bushing 6 in the hub.

The front portion 5' of the hub (which in the customary vehicle is hollow to give access to the fastening-nut or the linchpin) is completely closed and may be of any desired finish and material. It is preferably rounded off close to the spokes, as here shown.

The portion 2'' of the spindle between the shoulder 3 and the collar 4 receives two semi-annular flanges 8 8', that project interiorly from the two halves 9 9' of a shell or sleeve 9 9', which, extending forward, embraces the rear boss 5'' of the hub, and which, extending backward, shuts in the entire spindle and the two collars.

The two halves of the shell are hinged to one another, as at 10, the edges not thus fastened being made capable of being locked in position by a provision of a lip 11 on one of them, whose screw-threaded orifice 11' receives an attaching-screw 12, which is passed through a corresponding hole 11'' in the other half. This bolt 12 may be so prolonged as to penetrate the hub proper.

Lugs 13 13', that project inwardly from the respective half-shells occupying sockets 14 14' in the boss 5'' of the hub, prevent the escape of the hub from its place on the spindle, while at the same time permitting its free rotation with said shell upon said spindle.

A spring 15 permits the shell to be opened, as at Fig. IV, sufficiently for oiling, yet prevents such a degree of opening of the shell as would permit it to drop from the hub or allow the escape of the latter from its spindle.

Having thus described my invention, the following is what I claim as new therein and desire to secure by Letters Patent:

1. The combination, with axle-spindle having shoulder 3 and collar 4, of hub 5, having sockets 14, the two-part hinged clamping-shell 9 9' 10, having the semi-annular interior flanges 8 8', that engage between said shoulder and collar of the spindle, lugs 13 13', that engage in sockets 14 14' in the hub, and a fastening screw or bolt 12.

2. The combination, with the hinged two-part fastening-clamp 9 9' 10, of the fastening-screw 12, which penetrates the hub proper, as set forth.

3. The combination, with collared axle-spindle and socketed hub, of the two-part hinged clamping-shell having the spring 15, as and for the purpose stated.

LAFAYETTE FARIS.

Witnesses:
F. J. FARIS,
JENNIE DE HASS.